Figure 1:
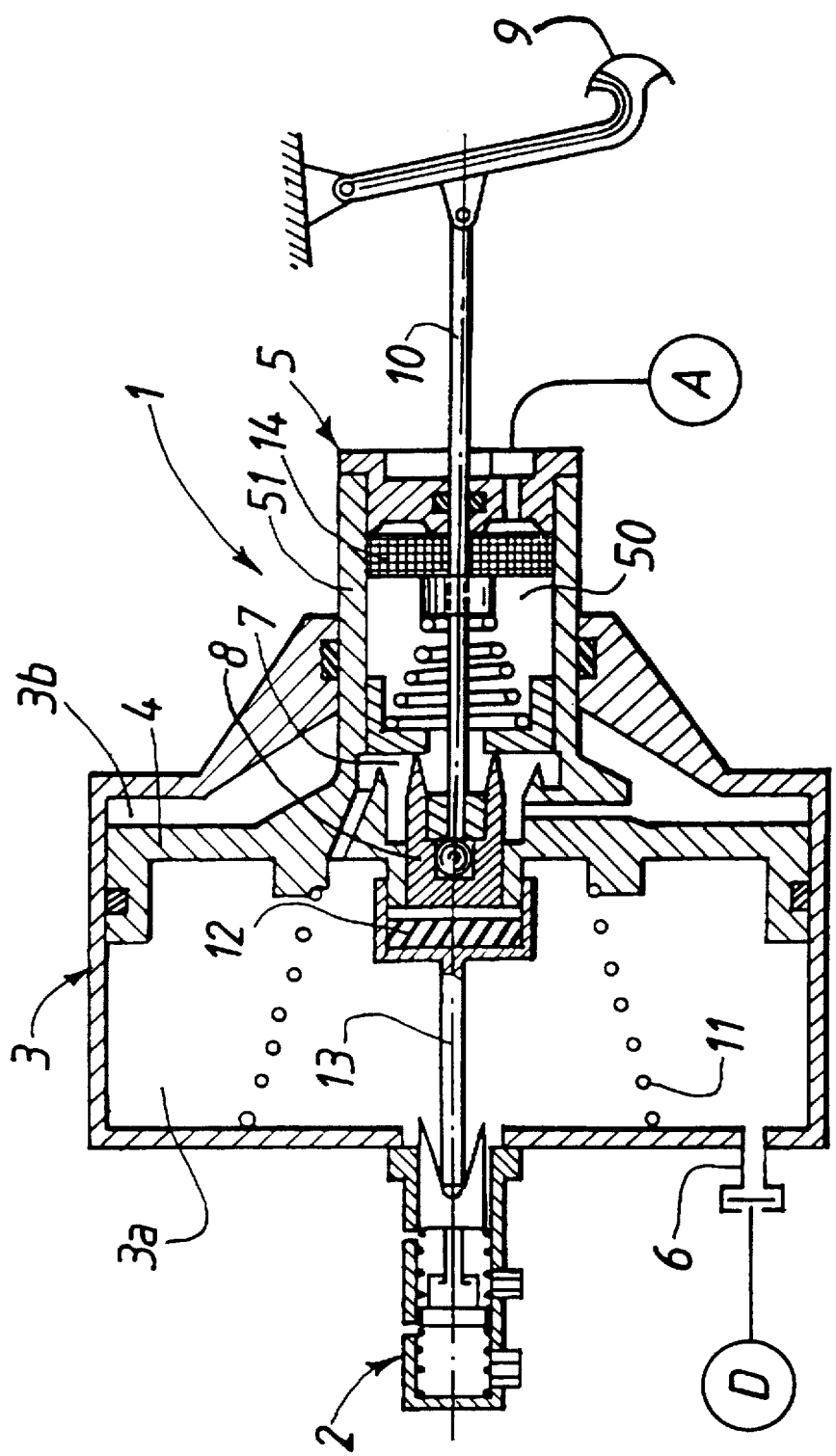

United States Patent [19]
Gautier et al.

[11] Patent Number: 5,799,559
[45] Date of Patent: Sep. 1, 1998

[54] BOOSTER WITH SIMPLIFIED COMPENSATION VOLUME

[75] Inventors: Jean Pierre Gautier; Ulysse Verbo, both of Aul Nay-Sous-Bois; Jean Jacques Carre, Le Raincy, all of France

[73] Assignee: Bosch Systems De Freinage, Drancy, France

[21] Appl. No.: 648,114

[22] PCT Filed: Apr. 23, 1996

[86] PCT No.: PCT/FR96/00614

§ 371 Date: May 21, 1996

§ 102(e) Date: May 21, 1996

[87] PCT Pub. No.: WO96/41738

PCT Pub. Date: Dec. 27, 1996

[30] Foreign Application Priority Data

Jun. 8, 1995 [FR] France ................. 95 06743

[51] Int. Cl.⁶ ..................................................... F15B 9/10
[52] U.S. Cl. ..................................................... 91/376 DR
[58] Field of Search .................... 91/369.1, 369.2, 91/369.3, 376 R

[56] References Cited

U.S. PATENT DOCUMENTS 5,233,907 8/1993 Gautier ................. 91/376 R

*Primary Examiner*—Edward K. Look
*Assistant Examiner*—Bijan N. Karimi
*Attorney, Agent, or Firm*—Leo H. McCormick, Jr.

[57] ABSTRACT

A pneumatic brake booster using first and second sources of air pressure and having a rigid casing (3) divided into at least first (3a) and second (3b) chambers by a *leaktight moving partition* (4). The moving partition (4) being capable of being urged by a pressure difference brought about by the actuation of a valve (7). Valve (7) having a tubular shut-off member (70) which together with an internal face (510) of a piston (5) delimits a compensation volume (74) that is permanently connected to the second chamber (3b). The shut-off member (70) of valve (7) facing first (71) and second (72) seats. The shut-off member (70) having a continuous and leaktight surface while the compensation volume (74) is connected to the second chamber (3b) by an axial piercing of a portion (8) of a greater thickness of a cylindrical wall (51) on the pneumatic piston (5).

2 Claims, 2 Drawing Sheets

BOOSTER WITH SIMPLIFIED COMPENSATION VOLUME

The present invention relates to a pneumatic rake booster for a motor vehicle, using first and second sources of air pressure delivering first and second respective air pressures, this booster comprising: a rigid casing; at least one moving partition dividing the rigid casing into at least two chambers in leaktight fashion, the first of which chambers is connected to the first source; a pneumatic piston linked to the moving partition and exhibiting an at least partially cylindrical wall sliding in the casing in leaktight fashion; a plunger mounted so that it can slide inside the pneumatic piston; a threeway valve operated by the plunger in order selectively to connect the second chamber to either one of the two sources and selectively subject the moving partition to a pressure difference, the valve comprising a tubular shut-off member and two annular seats including a first seat linked to the plunger and a second seat outside the first seat and linked to the piston, the shut-off member exhibiting an active face which can move axially when acted upon by the plunger and which is capable of interacting with each one of the two seats; and a compensation volume delimited in leaktight fashion between an internal face of the wall of the piston and the shut-off member, permanently communicating with the second chamber through a passage made in the pneumatic piston and isolated from the first chamber by the active face of the shut-off member being applied against the second seat.

A device of this type is especially described in the patent U.S. Pat. No. 5,233,907, well known to experts in this field.

This prior device offers the advantage of achieving balancing of the valve by virtue of a permanent inlet, into the compensation volume, of the pressure let into or prevailing in the second chamber of the booster, which avoids the booster exhibiting operating characteristics which depend on the pressure in the second chamber.

However, despite its widely acclaimed benefit, this prior device requires, in order to produce it, the use of a supplementary piston disk serving to delimit the compensation volume and assumes that orifices will be made in the active face of the valve, facing the two seats, something which limits the possibility of bringing the two seats closer together.

The object of the invention is to provide a booster which has performance levels at least very close to those of this prior booster, but which has a substantially simpler structure.

To this end, the booster of the invention is essentially characterized in that the active face of the valve, facing the two seats, exhibits a continuous and leaktight surface and in that the passage between the compensation volume and the second chamber is pierced directly in the cylindrical wall of the pneumatic piston.

For preference, the passage between the compensation volume and the second chamber consists of an axial piercing of a portion of greater thickness of the cylindrical wall of the pneumatic piston.

Figure 2:
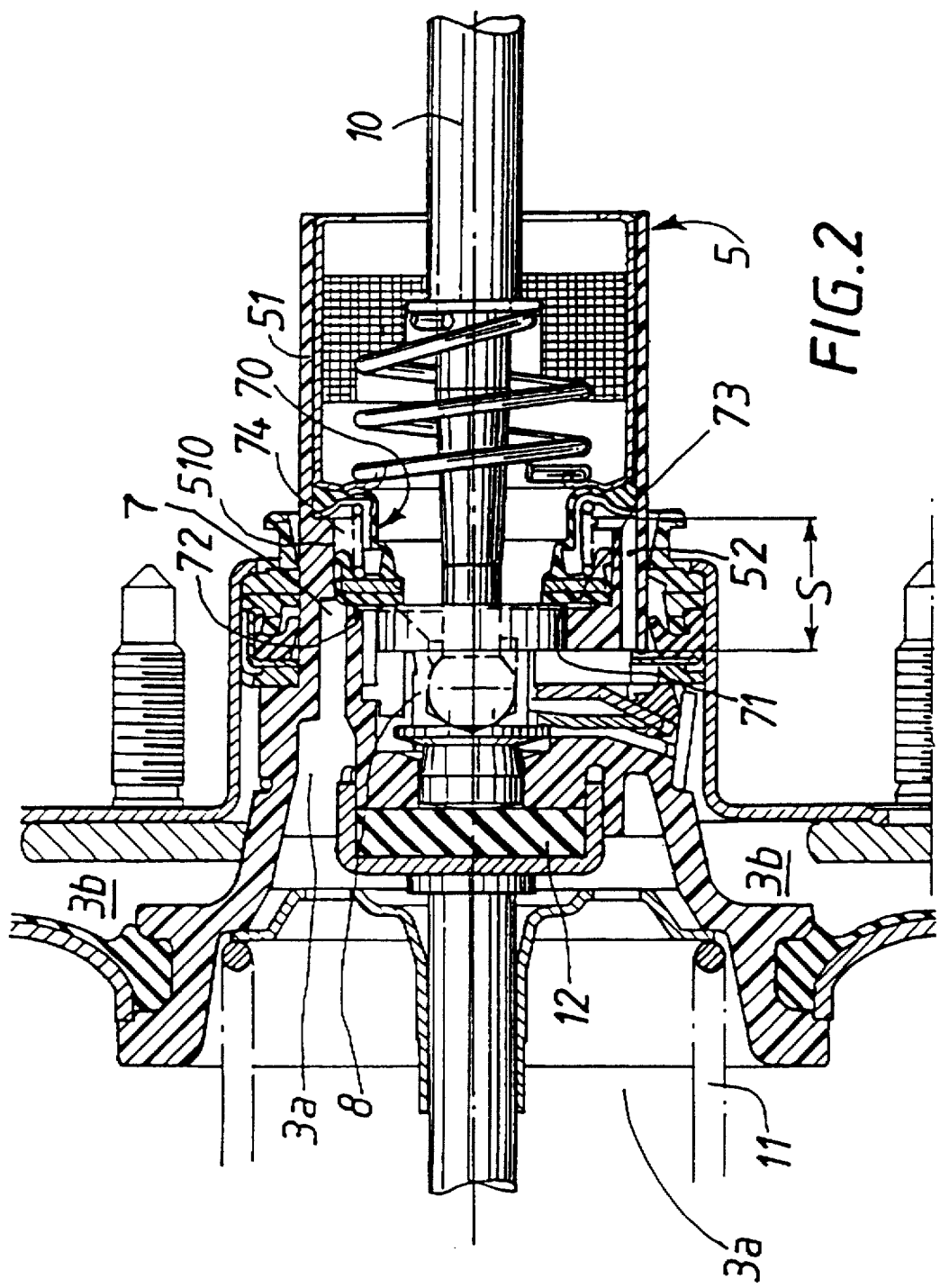

Further characteristics and advantages of the invention will emerge clearly from the description thereof given hereafter by way of non-limiting indication with reference to the appended drawings, in which:

FIG. 1 is a diagrammatic sectional view of a pneumatically boosted braking system using a very conventional booster, predating the aforementioned patent U.S. Pat. No. 5,233,907; and FIG. 2 is a part sectioned view of a booster in accordance with the invention.

Insofar as the invention relates merely to an improvement made to pneumatically boosted braking systems, and as the overall make-up and operation of the latter are well known to those skilled in the art, these systems will be recalled rapidly here merely to allow complete understanding of the improvement that the invention represents.

Schematically, a system of this type comprises a booster 1 and a master cylinder 2.

The booster itself comprises a rigid casing 3 divided into two chambers 3a and 3b in leaktight fashion by a moving partition 4 capable of driving a pneumatic piston 5 at least partially delimited by a cylindrical wall 51 and able to move with respect to the casing 3.

The front chamber 3a, the front face of which is closed in leaktight fashion by the master cylinder 2, is permanently connected to a source D of low pressure through a non-return valve 6.

In contrast, the rear chamber 3b can be connected selectively either to the source D of low pressure or to a source of high pressure, for example the atmosphere A.

To this end, access to the rear chamber 3b is controlled by a three-way valve 7 and a plunger 8 which are housed in the piston 5, the plunger being linked to a brake pedal 9 via an operating rod 10 and controlling the valve 7.

Furthermore, the booster conventionally comprises a purification filter 14 designed to prevent any contamination by the atmosphere A of the inside 50 of the pneumatic piston, of the valve 7, and of the rear chamber 3b.

When the operating rod 10 is in its position of rest, in this case pulled to the right, the valve 7 normally establishes a communication between the two chambers 3a and 3b of the booster.

As the rear chamber 3b is then subjected to the same depression as the front chamber 3a, the piston 5 is pushed back to the right, to the position of rest, by a return spring 11.

Actuation of the plunger 8 by a movement of the operating rod 10 (toward the left in the figures) has the effect, first of all, of acting on the valve 7 so that it isolates the chambers 3a and 3b from each other and then, secondly, of acting upon this valve in such a way that it opens the rear chamber 3b to atmospheric pressure A.

The difference in pressure between the two chambers, then felt by the moving partition 4, exerts on the latter a thrust which tends to shift it to the left and allow it to drive the piston 5 which in turn shifts, compressing the spring 11.

The braking force exerted on the plunger 8 by the operating rod 10, or "input force", and the brake-boosting force, or "boost force", resulting from the thrust of the moving partition 4 are combined on a reaction disk 12 in order to constitute an actuating force transmitted to the master cylinder via a push rod 13.

As shown by FIG. 2, which is more detailed than FIG. 1, the valve 7 in fact comprises, in a way known per se, a tubular shut-off member 70 and two annular seats, namely a first seat 71 linked to the plunger 8 and a second seat 72 outside the first seat and linked to the piston 5, the shut-off member 70 exhibiting an active face 73 which can move axially when acted upon by the plunger and which is capable of interacting with each one of the two seats.

Furthermore, in a way which is also known, the booster comprises a compensation volume 74 delimited in leaktight fashion between an internal face 510 of the wall of the piston 5 and the shut-off member 70, permanently communicating with the second chamber 3b through at least one passage 52 made in the pneumatic piston 5 and isolated from the first chamber 3a by the active face 73 of the shut-off member being applied against the second seat 72.

According to the invention, the active face 73 of the valve 7, facing the two seats 71 and 72, exhibits a continuous and leaktight surface as is the case with boosters which do not have a compensation volume, of the type illustrated in FIG. 1, and the passage 52 linking the compensation volume 74 to the second chamber 3b is pierced directly in the cylindrical wall 51 of the pneumatic piston 5.

As FIG. 2 shows, this passage 52 preferably consists of an axial piercing of a portion S of greater thickness of the cylindrical wall 51 of the pneumatic booster 5.

We claim:

1. Pneumatic brake booster using first and second sources of air pressure delivering first and second respective and different pressures, said booster comprising:

a rigid casing;

at least one moving partition dividing said rigid casing into at least first and second chambers in leaktight fashion, said first chambers being connected to said first source of air pressure;

a pneumatic piston connected to said moving partition and having a cylindrical wall which slides in said casing in a leaktight fashion;

a plunger mounted for sliding inside of said pneumatic piston;

a three-way valve operated by said plunger in order selectively to connect said second chamber to either one of the two sources and for selectively subjecting said moving partition to a pressure difference, said valve comprising a tubular shut-off member and first and second annular seats, said first seat being connected to said plunger and said second seat being located outside of said first seat and connected to said piston, said shut-off member exhibiting an active face which can move axially when acted upon by said plunger and which is capable of interacting with each of said first and second seats; and a compensation volume delimited in leaktight fashion between an internal face of said wall of said piston and said shut-off member, said compensation volume being permanently in communication with said second chamber through a passage made in said pneumatic piston and isolated from said first chamber by said active face of said shut-off member being applied against said second seat, characterized in that said active face of said valve, facing said first and second seats, exhibits a continuous and leaktight surface and in that said passage between said compensation volume and said second chamber is pierced directly in said cylindrical wall of said pneumatic piston.

2. The booster according to claim 1, characterized in that said passage between said compensation volume and said second chamber consists of an axial piercing of a portion of greater thickness of said cylindrical wall of said pneumatic piston.

* * * * *